United States Patent [19]

Isaacson et al.

[11] 3,816,026

[45] June 11, 1974

[54] AQUARIUM CIRCULATING APPARATUS

[75] Inventors: Louis Isaacson, Lexington; Richard Herrin, Framingham, both of Mass.

[73] Assignee: Woodingham Investment Company, Cambridge, Mass.

[22] Filed: Oct. 24, 1972

[21] Appl. No.: 300,220

[52] U.S. Cl. ............... 417/90, 417/108, 210/169
[51] Int. Cl. .......... F04f 1/18, E04h 3/16, E04h 3/20
[58] Field of Search ...... 417/90, 91, 108, 183, 184, 417/180; 210/169; 239/416, 417; 137/604

[56] References Cited
UNITED STATES PATENTS

| 1,574,783 | 3/1926 | Beth | 210/169 X |
| 2,636,780 | 4/1953 | Barnos | 239/417 |
| 2,674,574 | 4/1954 | Pettas | 417/108 X |
| 2,744,065 | 5/1956 | Lacey | 417/108 |
| 3,145,168 | 8/1964 | Scafuro | 210/169 |
| 3,152,987 | 10/1964 | Gare | 210/169 |
| 3,513,978 | 5/1970 | Newsteder | 210/169 |
| 3,516,544 | 6/1970 | Sesholtz | 210/169 |

FOREIGN PATENTS OR APPLICATIONS

| 16,803 | 8/1901 | Great Britain | 417/108 |

*Primary Examiner*—Carlton R. Croyle
*Assistant Examiner*—Richard E. Gluck

[57] ABSTRACT

An airlift assembly for use in a filter bowl associated with an aquarium tank for pumping the filtered water by means of forced air bubbles expelled through a tube of the assembly thereby circulating the filtered water into the aquarium tank.

12 Claims, 7 Drawing Figures

PATENTED JUN 11 1974  3,816,026

3,816,026

AQUARIUM CIRCULATING APPARATUS

FIELD OF THE INVENTION

The present invention relates in general to filtering and circulating apparatus for use with an aquarium tank to recirculate, and at the same time filter and aerate the water in the tank. More particularly, the present invention is concerned with an airlift type of pump assembly for recirculating filtered water previously drawn from the tank, such as by siphoning.

BACKGROUND OF THE INVENTION

One type of pump used for recirculating filtered water into an aquarium tank is a magnetic drive pump which is usually mounted outside of the filter bowl and is magnetically coupled to drive an impeller, or the like, disposed in the bowl. This arrangement is satisfactory but does have some drawbacks associated therewith. The entire pump is relatively large and part of it is contained external of the bowl. Especially for smaller fish tanks this type of a pump is somewhat impractical to use. Also, the magnetic drive pump is relatively expensive and has too many moving parts that may require periodic maintenance.

Another circulating pump is of the airlift type and includes an air stone disposed within a tube and connected to a source of air pressure for bubbling the water back into the aquarium tank. This type of a circulating system is also satisfactory but some of the disadvantages are that the air stones must be relatively large in order to be effective and are relatively expensive to purchase. Also, the air stone is another component that must be properly supported for suitable operation.

Another technique is to introduce the air from a forced air supply through an aperture disc having a plurality of apertures therethrough which apertures define air bubbles which are forced into the water for causing water circulation through an upstanding tube, for example. The primary drawback with this arrangement is that the air lift assembly cannot be fabricated easily by injection molding, keeping the apertures in the disc at the proper size. Therefore, with this type of arrangement it is usually necessary to provide a separately stamped aperture plate which must be then assembled and glued in position.

Accordingly, one object of the present invention is to provide an improved circulating apparatus of the airlift type for use in association with a filter bowl of an aquarium tank.

Another object of the present invention is to provide an improved airlift pump that may be injection molded and does not necessarily include separately manufactured pieces such as aperture discs or air stones. In a preferred embodiment the pump of the present invention is injection molded in two pieces which are easily assembled.

A further object of the present invention is to provide an airlift type pump for use in a fishbowl associated with an aquarium tank that is constructed of relatively few pieces, that is relatively inexpensive to fabricate, and that is quite compact. The pump of the present invention is readily useable with even relatively small filter bowls. The only externally disposed component is an air pump.

SUMMARY OF THE INVENTION

To accomplish the foregoing and other objects of the present invention there is provided an airlift type circulating apparatus for use in association with a filter bowl of an aquarium tank. This apparatus generally comprises an airlift assembly disposed below the water level in the filter bowl, a conduit means coupled from the airlift assembly for carrying the water expelled by the forced air to the aquarium tank, and an air pump coupled to the airlift assembly for directing air to the airlift assembly. This airlift assembly includes a first portion having one inlet port coupled from the air pump, a second portion including a water passage member having an inlet port in communication with the water in the bowl and an outlet port communicating with the conduit means, and means communicating intermediate the air inlet port and the water passage member for forcing air bubbles into the water and directing them toward the outlet port. The means for communicating between the air inlet port and the water passage member includes an air passage and means defining a plurality of spaced air inlets disposed in the inner walls of the member for introducing air bubbles into the water.

In a preferred embodiment the airlift assembly comprises two injection molded pieces including a top piece and a bottom piece. The top piece has a water outlet at its top end and also has an air inlet. The bottom piece is generally smaller in size, mates with the bottom end of the top piece, and is formed with an inlet water port aligning with the outlet port of the top piece. The air from the air inlet port is introduced by way of a plurality of slits disposed in the bottom section of the top part. These slits can be easily injection molded without having to use a separate aperture plate.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
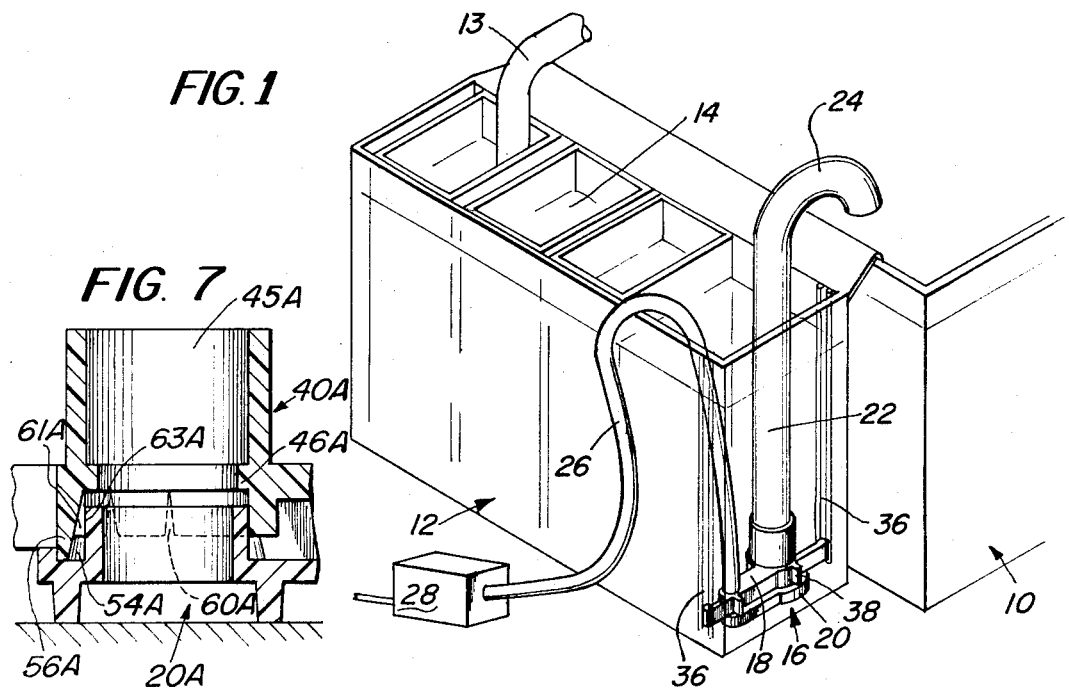
FIG. 1 is a fragmentary perspective view of an aquarium tank and filter bowl with the apparatus of the present invention disposed in the filter bowl.

Referring now to the drawings and in particular FIG. 1, there is shown a fragmentary perspective view of an aquarium tank 10 having a filter bowl 12 suitably secured to an outside edge thereof. The filter bowl 12 may comprise one or more filter bags 14 disposed in separate compartments of the bowl, and includes a siphon 13 for introducing the unfiltered water into one end of filter bowl 12. FIG. 1 shows the opposite end of the filter bowl wherein is disposed the airlift assembly 16 which includes a top part 18 and base part 20. A conduit 22 which may be a clear plastic tube carries the bubbling water up through the tube 22 down its U-shaped top end 24 and into the aquarium tank 10. FIG. 1 also shows the air inlet line 26 which couples to the top part 18 of the airlift assembly and has its other end coupled to a relatively small conventional air pump 28. Plastic clamps (not shown) may be provided for retaining air tube 26 adjacent to conduit 22 along a portion thereof. Pump 28 need not be mounted, as shown, but could be disposed away from the filter bowl.

Figure 2:
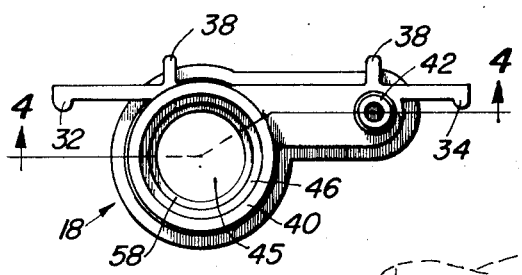
FIG. 2 is a top view of the top part of the airlift assembly shown in FIG. 1 along with the base part in position.
Figure 3:
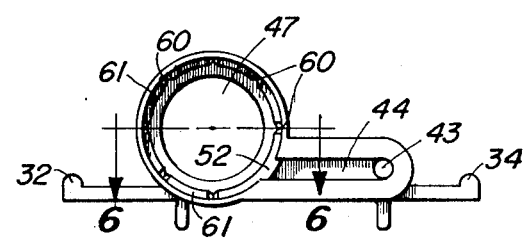
FIG. 3 is a bottom view of the top part of the airlift assembly shown in FIG. 2.

FIG. 2 is a top view of the top part 18 which is shown as including end tabs 32 and 34 which are used to position the airlift assembly in the filter bowl. These tabs 32 and 34 fit behind retaining barriers 36, as shown in FIG. 1, in the side walls of filter bowl 12. Part 18 also includes a pair of nipples 38 which touch the end wall of filter bowl 12 when the assembly is in position therein. The water passage portion 40 of part 18 is generally cylindrical and is shown clearly in FIGS. 4 and 6.

Referring now to FIGS. 2, 3, 4 and 6, there is shown an air inlet nipple 42 which defines an air inlet port 43 coupling air introduced from air tube 26 into an internal passage 44 defined in the top part 18.

Figure 4:
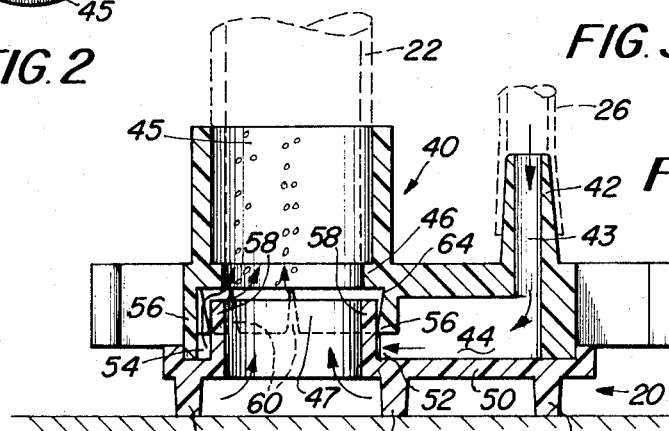
FIG. 4 is a cross-sectional view taken along line 4—4 of FIG. 2 and also including the base part of the airlift assembly secured in position.

The generally cylindrical water passage portion 40 has a top end defining a water outlet port 45 and an inwardly directed annular ridge 46 which may be used to limit the downward position of clear plastic conduit tube 22, as shown in FIG. 4, which fits relatively tightly in the outlet port 45. The bottom end of portion 40 (see FIGS. 4 and 6) defines a water inlet port 47 that may be of generally the same size as port 45.

Figure 5:
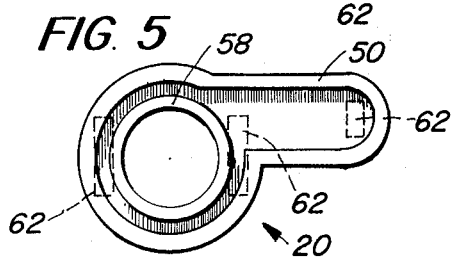
FIG. 5 is a plan view of the base part of the airlift assembly shown in FIG. 4.
Figure 6:
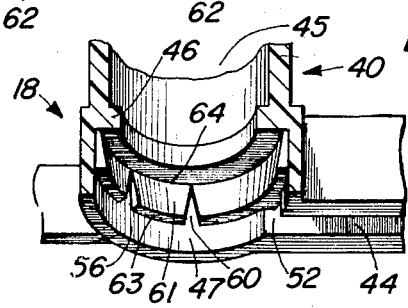
FIG. 6 is a bottom perspective cut-away view taken along line 6—6 of FIG. 3.

When the bottom or base part 20 is in position as shown in FIG. 4 its extending lip end 50 (see FIG. 5) defines in part passage 44 having an opening 52 for coupling air to the annular space 54 defined intermediate the bottom end 56 of member 40 and the upwardly extending annular flange 58 of bottom part 20. The air can then be expelled by way of slits 60 which are defined between respective wedge elements 61. The shape of elements 61 is most clearly shown in FIG. 6. They are thickest at their bottom end 63 and slope with a slight draft of approximately 5° outwardly to their top end 64, which terminates at ridge 46. The air in annular chamber 54 is forced, as shown in FIG. 4, through slits 60. A small space is provided between the top of flange 58 and ridge 46 so as to enable escape of the air bubbles to thereby force water up tube 22. In the embodiment of FIG. 6 the size of the air bubbles can be controlled by the entrance size of the slit at its maximum width.

Three bottom legs 62 extend from the bottom surface of base part 20 and support the assembly above the bottom of filter bowl 12.

Figure 7:
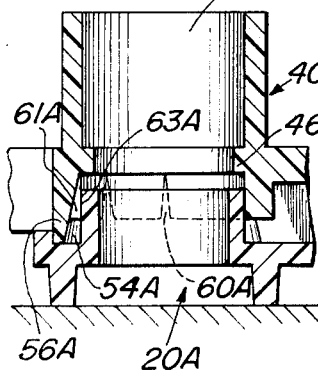
FIG. 7 is a fragmentary cross-sectional view of the type shown in FIG. 4 for another embodiment of the invention.

FIG. 7 shows another embodiment of this invention in a fragmentary view similar to the view shown in FIG. 4. The water passage portion 40A includes water outlet port 45A defined at its top end and annular limiting ridge 46A. Unlike the embodiment of FIG. 4, the one in FIG. 7 has a bottom end 56A with a tapered inner wall forming a thinner end than shown in FIG. 4 and a slightly larger annular chamber 54A. The base part 20A of FIG. 7 relates to the shape of the wedge elements 61A which define slits 60A. FIG. 6 indicates a slight draft to the wedge elements whereas in the embodiment of FIG. 7 the inwardly facing wall 63A of each wedge element is vertical and the inner wall of the end 56A is tapered. Thus, the size of the bubbles in this embodiment can be controlled by primarily controlling the slope of the inner surface of end 56A.

Having described a limited number of embodiments for the apparatus of the present invention it is now obvious that numerous other embodiments and modifications thereof should fall within the spirit and scope of the present invention. For example, the air inlet tube couples to the top part as shown in FIG. 4 but could alternatively couple to the base part. Also, the pump of this invention may be useable in environments other than the aquarium field.

What is claimed is:

1. A circulating apparatus for use in association with a filter bowl of an aquarium tank wherein water at least partially fills both the bowl and tank, said apparatus comprising:

an airlift assembly disposed below the water level in the filter bowl;
conduit means coupled from said airlift assembly for transferring the water to the aquarium tank;
and an air pump coupled to said airlift assembly;
said airlift assembly including means defining an inlet port for coupling to said air pump, a water passage portion having an inlet port in communication with the water in said bowl and an outlet port communicating with said conduit means, and means communicating intermediate said air inlet port and said water passage portion for forcing air bubbles into the water and directing them toward the outlet port;
said communicating means including an air passage and means defining a plurality of spaced air inlets disposed about the inner walls of said water passage portion for introducing air bubbles into said water;
said means defining a plurality of spaced air inlets including a plurality of wedge elements defining slits,
said wedge elements each having a substantially vertical inwardly facing surface and said communicating means having a tapered inwardly facing surface, the slope of said taper controlling the size of said air bubbles.

2. The apparatus of claim 1 wherein said airlift assembly includes means for securing said assembly in place in said filter bowl.

3. The apparatus of claim 2 wherein said securing means includes a pair of oppositely disposed tabs insertable in retaining means in opposite walls of the bowl.

4. The apparatus of claim 1 wherein said tapered inwardly facing surface slopes inwardly at the top end.

5. The apparatus of claim 1 comprising means for supporting said airlift assembly above a bottom wall of said bowl to permit entry of water to said water inlet port.

6. An air lift pump for pumping water from one container to another comprising means for receiving forced air, water passage means having a water inlet port and a water outlet port, means defining an inner peripheral channel intermediate the inlet and outlet ports and having a plurality of air inlets, and means communicating from said air receiving means to said means defining the air inlets, whereby air bubbles pass via said air inlets to force said water toward the outlet port, said water passage means including first and second mateable parts, said channel being defined between said parts and being annular in shape, said plurality of air inlets defined by slit defining means integrally formed with and extending inwardly of said first part, said second part including a peripheral wall fitting inside first part and defining therewith an annular air space for communicating air to said slits, said slit defining means including a plurality of spaced wedge elements having one end defining in part said annular air space and one end of said slit.

7. The pump of claim 6 wherein said wedge elements each have a substantially vertical inwardly facing surface fitting with the peripheral wall of said second part, and said first part has a tapered inwardly facing surface part of which defines part of said slits, the slope of said taper controlling the size of said air bubbles.

8. The pump of claim 7 wherein said tapered inwardly facing surface slopes inwardly at the top end.

9. An airlift type pumping system for use in association with a filter bowl of an aquarium tank wherein water at least partially fills both the bowl and tank, said system comprising:

an airlift assembly disposed below the water level in the filter bowl;

means for introducing water to be filtered into said filter bowl;

conduit means coupled from said airlift assembly for transferring the water to the aquarium tank;

means for supporting the airlift assembly in the filter bowl;

an air pump for providing pressurized air;

and means for coupling the pressurized air from the air pump to the airlift assembly;

said airlift assembly comprising;

a base part defining a water inlet port, a top part defining a water outlet port and having a bottom end, said base part having an upstanding annular flange received inside the bottom end of said top part, said top part having means defining a plurality of circumferentially disposed wedge elements defining a plurality of slits, said wedge elements being adjacent said annular flange and defining with said flange an annular air space for communicating air to said slits, an air inlet port, and an air passage communicating from said air inlet port to said annular air space.

10. The system of claim 9 wherein said top part has an inwardly extending ridge disposed above said wedge elements and positioned so that there is a space between said ridge and annular flange.

11. A circulating apparatus for use in association with a filter bowl of an aquarium tank wherein water at least partially fills both the bowl and tank, said apparatus comprising:

an airlift assembly disposed below the water level in the filter bowl;

conduit means coupled from said airlift assembly for transferring the water to the aquarium tank;

and an air pump coupled to said airlift assembly;

said airlift assembly including means defining an inlet port for coupling to said air pump, a water passage portion having an inlet port in communication with the water in said bowl and an outlet port communicating with said conduit means, and means communicating intermediate said air inlet port and said water passage portion for forcing air bubbles into the water and directing them toward the outlet port;

said communicating means including an air passage and means defining a plurality of spaced air inlets disposed about the inner walls of said water passage portion for introducing air bubbles into said water;

said means defining a plurality of spaced air inlet including a plurality of wedge elements defining slits, wherein said wedge elements each have a tapered inwardly facing surface sloping outwardly at the top end of each element, adjacent elements defining a wedge shaped slit having an entrance size controlling the air bubble size.

12. An airlift pump for pumping from one container to another comprising means for receiving forced air, mateable parts defining a water passage having a water inlet port and a water outlet port, said parts also defining a peripheral channel therebetween, means communicating from said air receiving means to said peripheral channel, and means extending from one of said parts and defining a plurality of spaced slits, said means defining the slits including a plurality of spaced wedge elements each having an entrance end defining in part said peripheral channel and one end of said slits, each said wedge element also having an exit end, each said slit being formed by at least one tapered wall for controlling the size of air bubbles passing therethrough, said wedge elements each being thinner at said exit end than at said entrance end.

* * * * *